US009681225B2

(12) United States Patent
Pompei

(10) Patent No.: US 9,681,225 B2
(45) Date of Patent: Jun. 13, 2017

(54) MODULATION SYSTEMS AND METHODS FOR PARAMETRIC LOUDSPEAKER SYSTEMS

(71) Applicant: Frank Joseph Pompei, Wayland, MA (US)

(72) Inventor: Frank Joseph Pompei, Wayland, MA (US)

( * ) Notice: Subject to any disclaimer, the term of this patent is extended or adjusted under 35 U.S.C. 154(b) by 0 days.

(21) Appl. No.: 14/996,521

(22) Filed: Jan. 15, 2016

(65) Prior Publication Data

US 2016/0227329 A1 Aug. 4, 2016

Related U.S. Application Data

(60) Provisional application No. 62/103,784, filed on Jan. 15, 2015.

(51) Int. Cl.
*H04B 15/00* (2006.01)
*H04R 25/00* (2006.01)
*H04R 3/00* (2006.01)

(52) U.S. Cl.
CPC .......... *H04R 3/00* (2013.01); *H04R 2217/03* (2013.01); *H04S 2400/09* (2013.01)

(58) Field of Classification Search
CPC ...... H04R 3/00; H04R 2217/03; H04R 17/00; H04S 2400/09
USPC .................. 381/94.1, 190, 191, 173, 58, 59
See application file for complete search history.

(56) References Cited

U.S. PATENT DOCUMENTS 8,983,098 B2 * 3/2015 Norris ..................... H04R 7/04 381/152

* cited by examiner

*Primary Examiner* — Paul S Kim
(74) *Attorney, Agent, or Firm* — BainwoodHuang

(57) ABSTRACT

Modulation systems and methods for use in parametric loudspeaker systems that can dynamically adjust modulation depths of ultrasonic carrier signals based on the levels of audio signals that the parametric loudspeaker systems are called upon to reproduce. The modulation systems and methods employ a dynamic level control function for determining a modulation offset that allows, (1) for low audio signal levels, a reduction of the modulation offset to obtain a reduced ultrasonic signal level, (2) for high level audio signals, full or maximum modulation of the ultrasonic carrier signal at an increased ultrasonic signal level, and, (3) for intermediate audio signal levels, under-modulation of the ultrasonic carrier signal at an intermediate ultrasonic signal level.

20 Claims, 5 Drawing Sheets

MODULATION SYSTEMS AND METHODS FOR PARAMETRIC LOUDSPEAKER SYSTEMS

CROSS-REFERENCE TO RELATED APPLICATIONS

This application claims benefit of the priority of U.S. Provisional Patent Application No. 62/103,784 filed Jan. 15, 2015 entitled MODULATION METHOD FOR PARAMETRIC LOUDSPEAKER.

TECHNICAL FIELD

The present application relates generally to modulation systems and methods for use in parametric loudspeaker systems, and more specifically to systems and methods of dynamically adjusting modulation depths in parametric loudspeaker systems.

BACKGROUND

Parametric loudspeaker systems are known that employ ultrasonic transducers for projecting ultrasonic carrier signals modulated with audio signals through the air for subsequent reproduction of the audio signals along a selected path of projection. A conventional parametric loudspeaker system can include a modulator for modulating an ultrasonic carrier signal with an audio signal, at least one driver amplifier for amplifying the modulated ultrasonic carrier signal, and one or more ultrasonic transducers for directing the amplified, modulated ultrasonic carrier signal through the air along the selected projection path. For example, each ultrasonic transducer can be a membrane transducer, such as an electrostatic transducer or a membrane-type piezoelectric transducer. Due to the non-linear propagation characteristics of the air, the modulated ultrasonic carrier signal is demodulated as it passes through the air, thereby reproducing the audio signal along the selected projection path.

In such a conventional parametric loudspeaker system, the modulation depth of the ultrasonic carrier signal has traditionally been allowed to remain relatively small when low-level audio signals are to be reproduced. Because the ultrasonic carrier signal itself is typically maintained at a high level, such low-level audio signals would cause a slight modulation of the ultrasonic carrier signal, while higher-level audio signals would cause a deeper modulation of the ultrasonic carrier signal. Such a modulation approach has drawbacks, however, in that it can adversely affect the efficiency of the parametric loudspeaker system, allowing the system to generate high ultrasonic signal levels even in the absence of audible sound. Increasing the modulation depth of the ultrasonic carrier signal when modulated with low-level audio signals may enhance the overall efficiency of the parametric loudspeaker system. However, this further modulation approach also has drawbacks in that it can increase the bandwidth of the ultrasonic signal, potentially increasing audible distortion upon reproduction of the audio signal.

It would therefore be desirable to have improved modulation systems and methods for use in parametric loudspeaker systems that can avoid at least some of the drawbacks of conventional parametric loudspeaker systems.

SUMMARY

In accordance with the present application, modulation systems and methods for use in parametric loudspeaker systems are disclosed that can dynamically adjust modulation depths of ultrasonic carrier signals based on the levels of audio signals that the parametric loudspeaker systems are called upon to reproduce. The disclosed modulation systems and methods employ a dynamic level control function for determining a modulation offset that allows, (1) for low audio signal levels, a reduction of the modulation offset to obtain a reduced ultrasonic signal level, (2) for high level audio signals, full or maximum modulation of the ultrasonic carrier signal at an increased ultrasonic signal level, and, (3) for intermediate audio signal levels, under-modulation of the ultrasonic carrier signal at an intermediate ultrasonic signal level.

In one aspect, an exemplary parametric loudspeaker system includes (1) a modulator for modulating an ultrasonic carrier signal with an audio signal, the audio signal having, for a duration of the audio signal, low audio signal levels, intermediate audio signal levels, and high audio signal levels, (2) at least one driver amplifier for amplifying the ultrasonic carrier signal, and (3) one or more ultrasonic transducers for directing the ultrasonic carrier signal through the air along a selected projection path. The modulator is operative, for the intermediate audio signal levels, to modulate the ultrasonic carrier signal with the audio signal at under-modulation, for the low audio signal levels, to reduce a modulation offset in order to obtain a reduced ultrasonic signal level, and, for the high audio signal levels, to modulate the ultrasonic carrier signal with the audio signal at full or maximum modulation.

By under-modulating the ultrasonic carrier signal when such intermediate audio signal levels are to be reproduced, the bandwidth of the ultrasonic signal can, in turn, be reduced, thereby allowing the parametric loudspeaker system to reproduce audio signals with increased accuracy, while maintaining audible distortion at an acceptable minimum.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein, and, together with the Detailed Description, explain these embodiments. In the drawings.

DETAILED DESCRIPTION

The disclosure of U.S. Provisional Patent Application No. 62/103,784 filed Jan. 15, 2015 entitled MODULATION METHOD FOR PARAMETRIC LOUDSPEAKER is hereby incorporated herein by reference in its entirety.

Modulation systems and methods for use in parametric loudspeaker systems are disclosed that can dynamically adjust modulation depths of ultrasonic carrier signals based on the levels of audio signals that the parametric loudspeaker systems are called upon to reproduce. The disclosed modulation systems and methods employ a dynamic level control function for determining a modulation offset function that allows, (1) for low audio signal levels, a reduction of the modulation offset to obtain a reduced ultrasonic signal level, (2) for high level audio signals, full or maximum modulation of the ultrasonic carrier signal at an increased ultrasonic signal level, and, (3) for intermediate audio signal levels, under-modulation of the ultrasonic carrier signal at an intermediate ultrasonic signal level. By under-modulating the ultrasonic carrier signal when such intermediate audio signal levels are to be reproduced, the bandwidth of the ultrasonic signal can, in turn, be reduced, thereby allowing the parametric loudspeaker system to reproduce audio signals with increased accuracy and minimal audible distortion.

Figure 1:
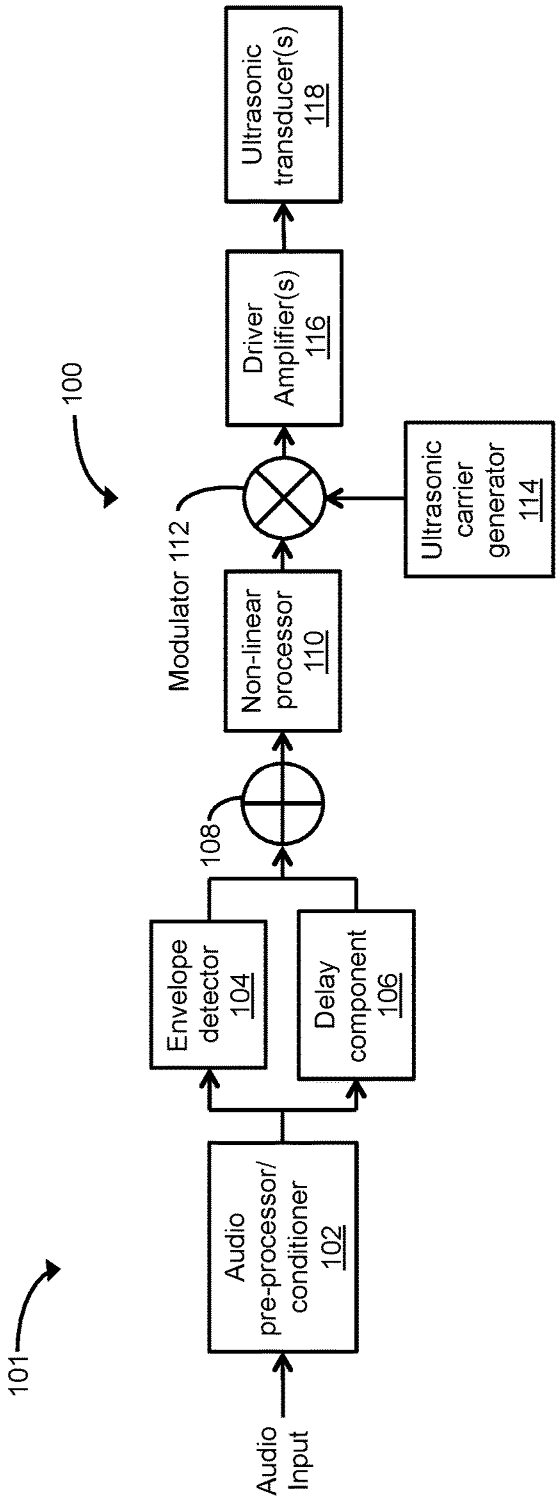
FIG. 1 is a block diagram of an exemplary modulation system for dynamically adjusting modulation depth in an exemplary parametric loudspeaker system, in accordance with the present application.

FIG. 1 depicts an illustrative embodiment of an exemplary modulation system 100 for use in an exemplary parametric loudspeaker system 101, in accordance with the present application. As shown in FIG. 1, the parametric loudspeaker system 101 can include an audio pre-processor/conditioner 102, an envelope detector 104, an optional delay component 106, a summing circuit 108, a non-linear processor 110, a modulator 112, an ultrasonic carrier generator 114, one or more driver amplifiers 116, and one or more ultrasonic transducers 118. Such an exemplary parametric loudspeaker system is disclosed in U.S. Pat. No. 7,391,872 issued Jun. 24, 2008 entitled PARAMETRIC AUDIO SYSTEM, the disclosure of which is hereby incorporated herein by reference in its entirety.

In one mode of operation, the audio pre-processor/conditioner 102 can receive an audio input signal, and perform equalization, compression, and/or any other suitable pre-processing/conditioning of the audio input signal. The audio pre-processor/conditioner 102 provides the pre-processed/conditioned audio input signal to the envelope detector 104, and, optionally, to the delay component 106. The envelope detector 104 can detect the envelope of the audio input signal and provide an adjusting offset such that, when the summing circuit 108 sums the envelope signal with the audio input signal, the resulting signal sum is entirely positive. This allows the non-linear processor 110 to apply a suitable non-linear function (e.g., a square root function) to the output of the summing circuit 108 accurately. The delay component 106 can apply a small delay to the audio input signal, as well as scale the audio input signal, before the audio input signal is summed with its envelope by the summing circuit 108. Such a small delay applied to the audio input signal by the delay component 106 can allow the envelope detector 104 to effectively anticipate the audio input signal and modify its envelope accordingly so that the output of the summing circuit 108 remains entirely positive. The non-linear processor 110 receives the signal sum provided by the summing circuit 108, and applies the non-linear function (e.g., the square root function) to the signal sum in order to reduce non-linear distortion. The modulator 112 receives the distortion-reduced audio signal from the non-linear processor 110, as well as an ultrasonic carrier signal from the ultrasonic carrier generator 114, and multiplies the ultrasonic carrier signal with the audio signal to produce a modulated ultrasonic carrier signal. The driver amplifier(s) 116 receive the modulated ultrasonic carrier signal, amplify the modulated ultrasonic carrier signal, and provide the amplified, modulated ultrasonic carrier signal to the ultrasonic transducer(s) 118, which direct the modulated ultrasonic carrier signal through the air along a selected path of projection. Having been directed along the selected path of projection by the ultrasonic transducer(s) 118, the modulated ultrasonic carrier signal is demodulated as it passes through the air, thereby reproducing the audio signal along the selected projection path.

Modulation Depth Adjustment

In earlier parametric loudspeaker systems, there was frequently no attempt to adjust ultrasonic levels as a function of the desired audio output level. In general, the ultrasonic output was always at or near its maximum, and low-level audio signals would modulate slightly, while higher-level audio signals would modulate more deeply. Such a modulation approach can be expressed using the general equation for modulation, as follows:

$$y(t)=E(t)\sin \omega t, \tag{1}$$

in which "y(t)" represents the final signal output (may be proportional, in arbitrary units), "E(t)" represents the modulation envelope, "ω" corresponds to the carrier frequency, and "t" represents time. For example, "y(t)" can correspond to the modulated, inaudible, primary ultrasonic signal generated by the parametric loudspeaker system 101 of FIG.

The modulation envelope, E(t), can be expressed, as follows:

$$E(t) = \left[\frac{1}{2}(1 + mg(t))\right]^{\frac{1}{2}}, \tag{2}$$

in which "m" represents the modulation depth, and "g(t)" represents the audio input signal having an expected maximum amplitude of unity. For distortion reduction, the value in the outer brackets of equation (2) can be square-rooted or otherwise nonlinearly modified in order to create the final modulation envelope, E(t). Such square-rooting provides a reasonable approximation for the purposes of this application, but such a technique can apply to any suitable distortion reduction method. One drawback of this modulation approach is that, in the absence of audible sound, the parametric loudspeaker system can continue to output substantial amounts of ultrasound. This is unnecessary and wasteful, and can cause undue stress on the components of the parametric loudspeaker system.

To remedy this, a dynamic level control function, L(t), can be introduced in equation (2) to track the level of the audible sound and provide just enough offset to keep the parametric loudspeaker system 101 essentially fully modulated in the steady state. Having introduced the dynamic level control function, L(t), the modulation envelope, E(t), can be expressed, as follows:

$$E(t) = \left[\frac{1}{2}(L(t) + mg(t))\right]^{\frac{1}{2}}. \tag{3}$$

It is noted that, in equation (3), "L(t)" can be implemented as an envelope follower function, or any other suitable function. For example, the function, L(t), can be implemented using a peak level detector with a slow decay to assure that it reacts quickly to the incoming audio signal, but avoids generating any audible artifacts. In the steady state, the function, L(t), effectively matches the amplitude of the audio input signal, g(t) (or mg(t), in which the audio input signal, g(t), is scaled by "m"), assuring that the sum "L(t)+mg(t)" in the parentheses of equation (3) is always positive, which prevents over-modulation. For maximum efficiency, the function, L(t), can track the amplitude of the audio input signal, g(t), so that the modulation depth is effectively "full" as often as possible. Such implementation of the function, L(t), is disclosed in U.S. Pat. No. 8,027,488 issued Sep. 27, 2011 entitled PARAMETRIC AUDIO SYSTEM, the disclosure of which is hereby incorporated herein by reference in its entirety. It is noted that the modulation depth, m, is usually very close to unity.

While the modulation envelope, E(t), of equation (3) can be used to maximize the efficiency of the parametric loudspeaker system 101 such that essentially all of the ultrasound is being used to create audio, it can also maximize the ultrasonic bandwidth of the system, potentially causing an increase in audible distortion. This can be avoided by intentionally under-modulating the ultrasonic carrier signal in some cases of the audio input signal, thereby trading a bit of conversion efficiency for a clearer audible sound. By performing such under-modulating of the ultrasonic carrier signal, the bandwidth of the resulting ultrasonic signal is reduced, allowing the audio signal to be reproduced more easily and accurately by the parametric loudspeaker system 101.

In one embodiment, the degree of under-modulation performed by the modulation system 100 (which can include an audio level detector, a modulation depth controller, as well as the modulator 112; see FIG. 1) is flexible, providing a continuous tradeoff between energy usage and desired sound clarity improvement. There are two cases to be considered, as it is generally undesirable to have the modulation system 100 always under-modulate the ultrasonic carrier signal. Such continuous under-modulation of the ultrasonic carrier signal can (1) lead to the transmission of substantial ultrasound when no audible sound is being reproduced, and, (2) because the modulated ultrasonic carrier signal is never fully modulated, the parametric loudspeaker system 101 will have a reduced output capacity, as any unmodulated ultrasound is mostly "wasted" and not used for audible sound reproduction.

The remedy is to allow full or maximum modulation at the highest audio output levels, as well as (effectively) at the lowest audio output levels. This allows for full or maximum modulation at maximum output so that effectively all of the capacity of the parametric loudspeaker system 101 is utilized, while preventing much ultrasound from being radiated when little to no audible sound is to be reproduced.

In order to incorporate the desired under-modulation functionality into the modulation system 100 of FIG. 1, a modulation offset function, M(t), can be added to the modulation envelope, E(t), as follows:

$$E(t)=N\{L(t)+M(t)+mg(t)\}, \tag{4}$$

in which "N{ . . . }" corresponds to a nonlinear operator function. In one embodiment, the nonlinear operator function, N{ . . . }, can be a square root operator function (or any other suitable nonlinear operator function), as follows:

$$E(t)=(L(t)+M(t)+mg(t))^{\frac{1}{2}}. \tag{4.1}$$

For example, the modulation offset function, M(t), can, like the function, L(t), be derived from the peak amplitude or the peak envelope of the audio input signal, or any other suitable technique. It is noted, however, that deriving the function, M(t), using a rolling average, or by monitoring an average level of the audio input signal, can lead to over-modulation and is therefore avoided. For example, such over-modulation can occur in the case where an averaging interval includes a low level audio signal followed by a high level transient (e.g., due to the start of a speech, or the initial playing of a musical instrument), which can effectively disappear into the averaging interval and lead to over-modulation. An exemplary curve for such a modulation offset function, M(t), is illustrated in FIG. 2 with reference to the dynamic level control function, L(t).

Figure 2:
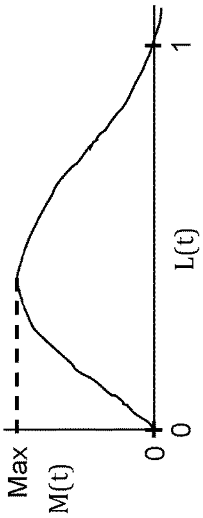
FIG. 2 is a diagram of an exemplary dynamic level control function, L(t), for determining an exemplary modulation offset function, M(t), for use in the modulation system of FIG. 1.

As shown in FIG. 2, the dynamic level control function, L(t), can be used to determine the modulation offset, M(t). It is noted, however, that any suitable function based on the amplitude of the audible signal (i.e., representative of the audio signal level) may alternatively be used (e.g., a peak-detect function, an envelope follower function, etc.). With regard to the exemplary curve of FIG. 2, it is further noted that the horizontal axis can extend from zero ("0") to the system maximum in arbitrary units (e.g., 0, 1). In general, the modulation offset function, M(t), should, like the function, L(t), be slowly changing, so as to avoid audible byproducts. The exemplary curve of FIG. 2 is also preferably reasonably smooth (although this is not a requirement) to avoid the addition of transitional audible artifacts as signal levels change.

With reference to the exemplary curve of FIG. 2, for small audio signal levels (near L(t)=0), there is no extra modulation offset added (i.e., M(t)=0) by the modulation system 100, so very little (or zero) ultrasound will be output by the parametric loudspeaker system 101. With further reference to the exemplary curve of FIG. 2, for high audio signal levels (near L(t)=1, which is assumed to be the system maximum), there is likewise no extra modulation offset added (i.e., M(t)=0) by the modulation system 100, so the parametric loudspeaker system 101 will fully modulate and make the most out of all of the ultrasonic energy available.

Between such low audio signal levels (near L(t)=0; see FIG. 2) and high audio signal levels (near L(t)=1; see FIG. 2), the modulation system 100 can add an extra modulation offset (i.e., M(t); see equation (4)) to cause the parametric loudspeaker system 101 to under-modulate. As discussed herein, such under-modulation reduces the required ultrasonic bandwidth, and further reduces audible distortion for such intermediate audio signal levels. Therefore, for most of the system operation time, audible distortion is reduced, without sacrificing the benefits of the modulation depth control methods encompassed in the dynamic level control function, L(t).

The specific shape and amplitude of the modulation offset function, M(t), is flexible, and can be chosen to tradeoff energy usage with sound clarity. It should just have a maximum (M(t)=Max; see FIG. 2) somewhere between minimum (L(t)=0; see FIG. 2) and maximum (L(t)=1; see FIG. 2), and be near zero (M(t)=0; see FIG. 2) at the extremes (near L(t)=0 and L(t)=1; see FIG. 2). For example, the modulation offset function, M(t), can be implemented as a smooth curve (see, for example, FIG. 2), a piecewise curve, a square-shaped curve, or any other suitable curve. In one embodiment, the modulation offset function, M(t), can have about 20% offset, or any other suitable offset, at mid-level amplitudes. In a further embodiment, the modulation offset function, M(t), can have a frequency or any other suitable signal dependence.

The operation of the modulation system 100 in conjunction with the parametric loudspeaker system 101 will be further understood with reference to the following illustrative examples, and FIGS. 1, 3*a*-3*d*, 4*a*-4*d*, and 5*a*-5*d*. It is noted that the following illustrative examples pertain to the generation of steady audible tones, however such illustrative examples would also apply to the generation of dynamic audible content (e.g., speech, music).

Figure 3A:
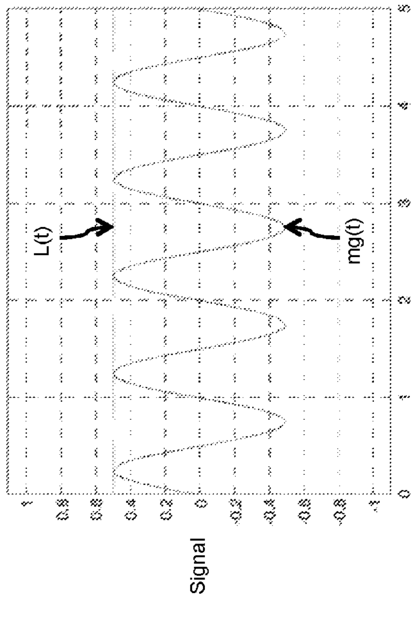
FIGS. 3*a*-3*d*, 4*a*-4*d*, and 5*a*-5*d* are diagrams illustrating exemplary operations of the modulation system of FIG. 1.
Figure 3B:
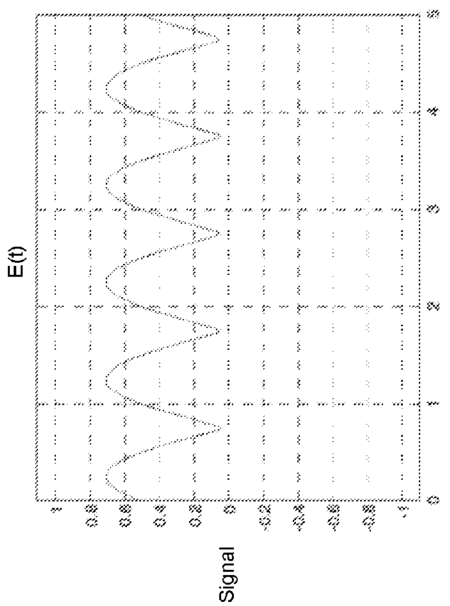
Figure 3C:
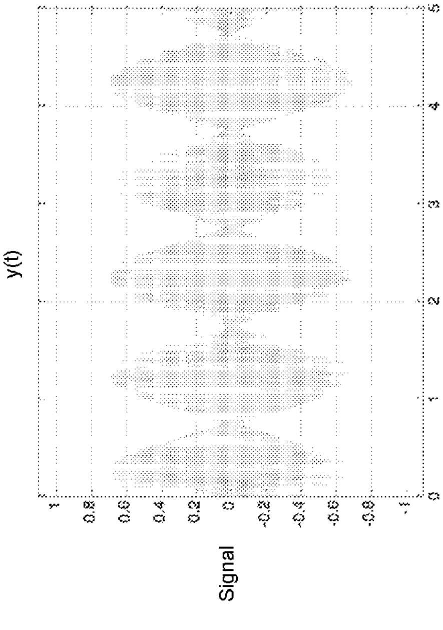
Figure 3D:
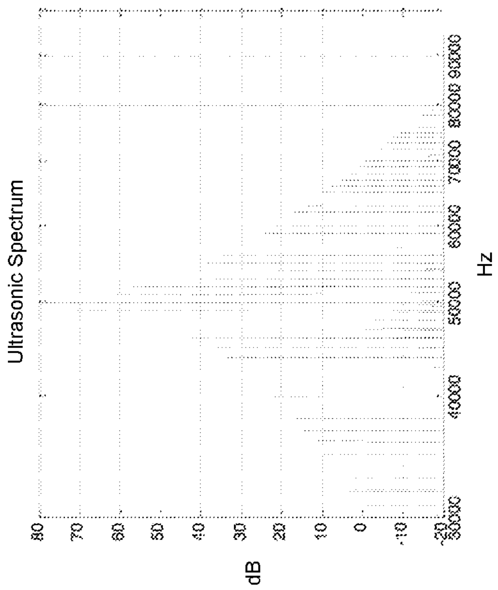

FIGS. 3*a*-3*d* depict the case of a 1 kHz tone at mid-level, which becomes modulated by the modulation system 100 (see FIG. 1) at 50 kHz, with m~0.99. FIG. 3*a* depicts the dynamic level control function, L(t), and the audio input signal, g(t), scaled by "m," and FIG. 3*b* depicts the modulation envelope, E(t). FIG. 3*c* depicts the modulated ultrasonic signal, y(t), generated by the parametric loudspeaker system 101 (see FIG. 1), and FIG. 3*d* depicts the ultrasonic spectrum. In FIGS. 3*a*-3*d*, M(t)=0 and the resulting signal is approximately fully modulated. In FIG. 3*d*, note the wide bandwidth (up to about 80 kHz) of the ultrasonic spectrum.

Figure 4A:
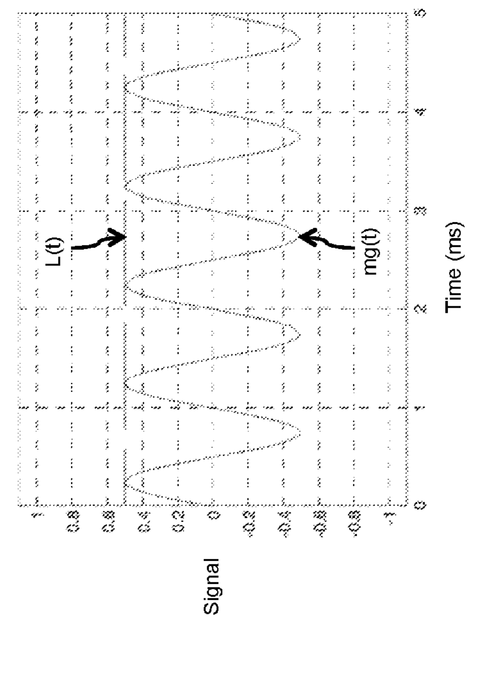
Figure 4B:
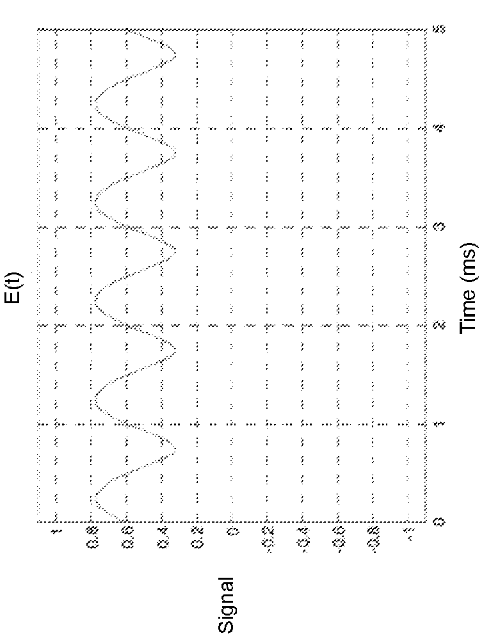
Figure 4C:
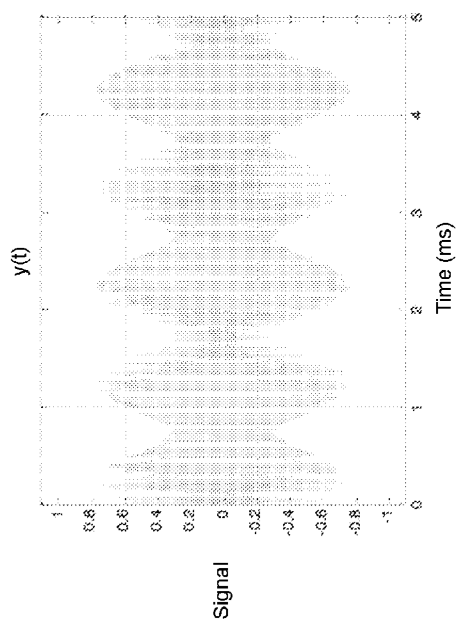
Figure 4D:
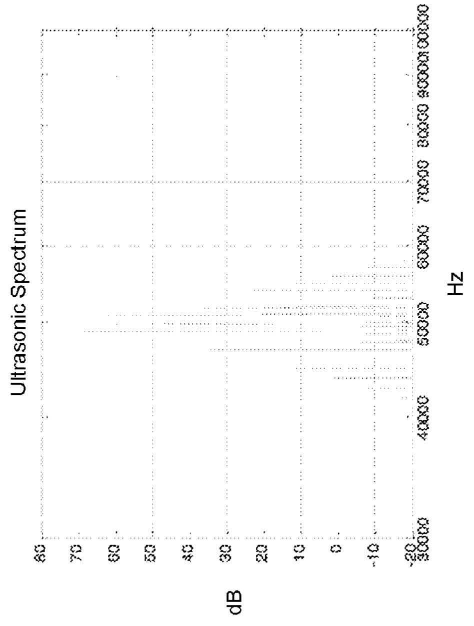

If a modulation offset of M(t)=0.2 is selected when L(t)=0.5, then the signals depicted in FIGS. 4*a*-4*d* would result. FIG. 4*a* depicts the dynamic level control function, L(t), and the audio input signal, g(t), scaled by "m," and FIG. 4*b* depicts the modulation envelope, E(t). FIG. 4*c* depicts the modulated ultrasonic signal, y(t), generated by the parametric loudspeaker system 101 (see FIG. 1), and FIG. 4*d* depicts the ultrasonic spectrum. In FIGS. 4*a*-4*d*, note that the signal is now under-modulated by the modulation system 100 (see FIG. 1), and that the ultrasonic spectrum of FIG. 4*d* is significantly narrower (ranging between about 40 kHz and 60 kHz). Comparing the ultrasonic signal y(t) of FIG. 3*c* with the ultrasonic signal y(t) of FIG. 4*c*, it can be seen that the output amplitude is slightly higher in the ultrasonic signal of FIG. 4*c*, reflecting the use of slightly more energy to reproduce the same audio output. This method results in far less reproduction distortion, as the required bandwidth in the ultrasonic range is much smaller.

Figure 5A:
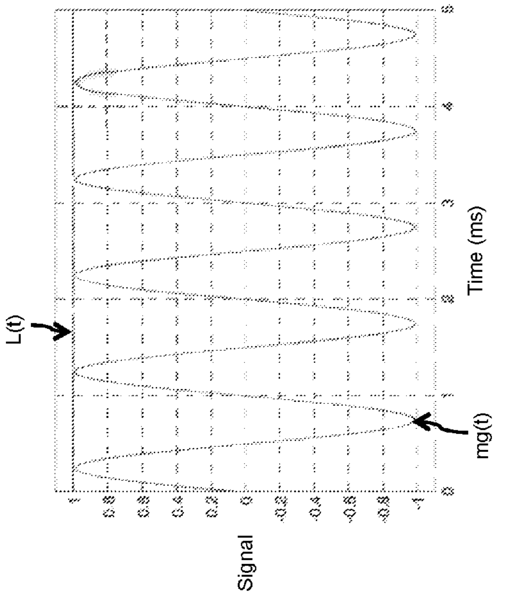
Figure 5B:
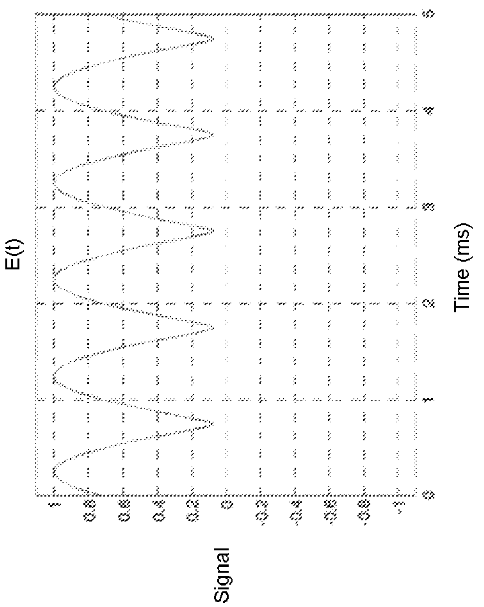
Figure 5C:
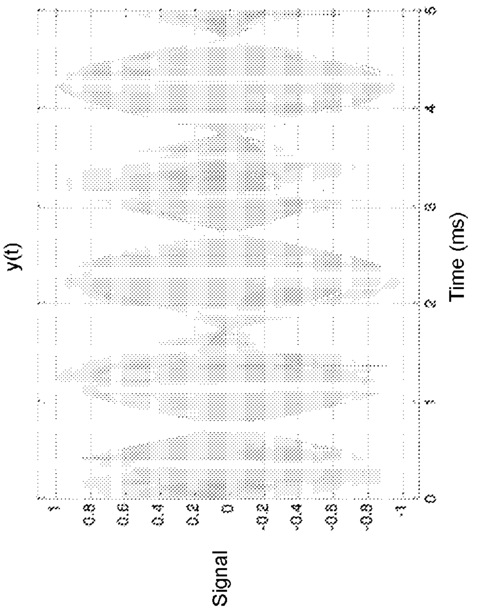
Figure 5D:
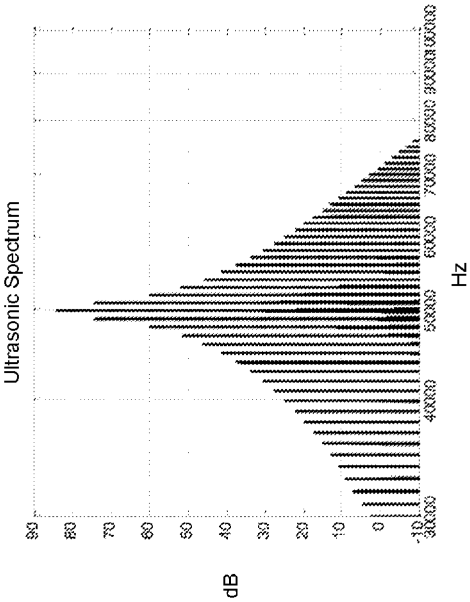

It is noted that for an audio input signal level close or equal to zero, all signal levels generated by the parametric loudspeaker system 101 incorporating the modulation system 100 would be (approximately) zero or very low. FIGS. 5*a*-5*d* depict the case where M(t)=0, resulting in a maximum output level signal and a full use of all ultrasound. FIG. 5*a* depicts the dynamic level control function, L(t), and the audio input signal, g(t), scaled by "m," and FIG. 5*b* depicts the modulation envelope, E(t). FIG. 5*c* depicts the modulated ultrasonic signal, y(t), generated by the parametric loudspeaker system 101 (see FIG. 1), and FIG. 5*d* depicts the ultrasonic spectrum. It is further noted that the ultrasonic spectrum depicted in FIG. 5*d* is similar to the ultrasonic spectrum depicted in FIG. 3*d*, which corresponds to the fully modulated case.

Figure 6:
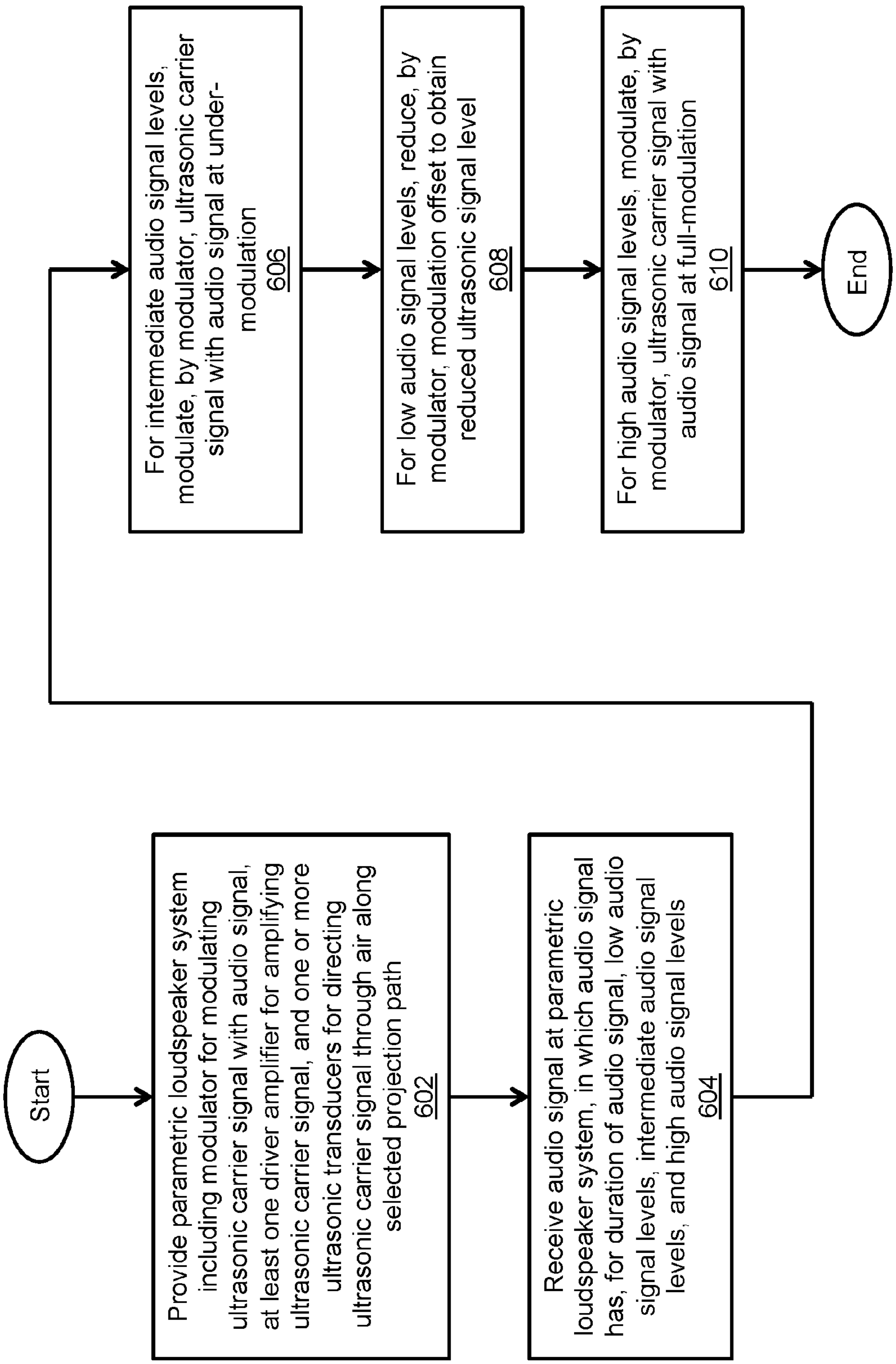
FIG. 6 is a flow diagram of an exemplary method of operating the modulation system of FIG. 1.

An exemplary method of operating the parametric loudspeaker system 101 in conjunction with the modulation system 100 is described herein with reference to FIG. 6. As depicted in block 602, a parametric loudspeaker system is provided including a modulator for modulating an ultrasonic carrier signal with an audio signal, at least one driver amplifier for amplifying the ultrasonic carrier signal, and one or more ultrasonic transducers for directing the ultrasonic carrier signal through the air along a selected projection path. As depicted in block 604, the audio signal is received at the parametric loudspeaker system, in which the audio signal has, for the duration of the audio signal, low audio signal levels, intermediate audio signal levels, and high audio signal levels. As depicted in block 606, for the intermediate audio signal levels, the ultrasonic carrier signal is modulated by the modulator with the audio signal at under-modulation. As depicted in block 608, for the low audio signal levels, a modulation offset is reduced, by the modulator, to obtain a reduced ultrasonic signal level. As depicted in block 610, for the high audio signal levels, the ultrasonic carrier signal is modulated by the modulator with the audio signal at full (or maximum) modulation.

As described herein, by carefully under-modulating mid-level signals, while fully modulating maximum output signals, ultrasonic bandwidth and audible distortion can be reduced for most signals, without sacrificing the maximum output levels. Alternatively, at the low signal end, in the event no audio is present for some period of time, the output amplifier can be turned-off (or have its volume set to zero), which is another way of setting the modulation offset, M(t), to zero in the steady state.

As further described herein, the modulation system 100 for dynamically adjusting modulation depth in the parametric loudspeaker system 101 includes parametric loudspeaker features such as an audio level detector and a modulation depth control, in which the modulation offset function, M(t), depends on the output level, and, in particular, is near zero (i.e., M(t)=0; see FIG. 2) at high and low levels (i.e., near L(t)=0 and L(t)=1; see FIG. 2) and reaches a maximum (i.e., M(t)=Max; see FIG. 2) between such high and low levels. It is noted that the modulation system 100 may alternatively employ an inverse of the modulation offset function, M(t), using a negative modulation offset instead of a positive modulation offset. Other exemplary curve types for the modulation offset function, M(t), include steps, squares, polynomials, or any other suitable curve types. It is further noted that the functions L(t) and M(t) may be combined in a single functional block. The modulation system 100 described herein applies to any suitable modulation scheme, including, but not limited to, double sideband (DSB) modulation, single sideband (SSB) modulation, and hybrid modulation.

It should be appreciated that the terms and expressions employed herein are used as terms of description and not of limitation, and that there is no intention in the use of such terms and expressions of excluding any equivalents of the features shown and described or portions thereof.

It will be further appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. In a parametric loudspeaker system comprising a modulator for modulating an ultrasonic carrier signal with an audio signal, at least one driver amplifier for amplifying the ultrasonic carrier signal, and one or more ultrasonic transducers for directing the ultrasonic carrier signal through air along a selected projection path, a method of modulating the ultrasonic carrier signal, comprising:

receiving the audio signal at the parametric loudspeaker system, the audio signal having, for a duration of the audio signal, low audio signal levels, intermediate audio signal levels, and high audio signal levels;

for the intermediate audio signal levels, modulating, by the modulator, the ultrasonic carrier signal with the audio signal at under-modulation;

for the low audio signal levels, reducing a predetermined modulation offset to obtain a reduced ultrasonic signal level; and for the high audio signal levels, modulating, by the modulator, the ultrasonic carrier signal with the audio signal at maximum modulation.

2. The method of claim 1 wherein the modulating of the ultrasonic carrier signal with the audio signal at under-modulation and at maximum modulation includes modulating the ultrasonic carrier signal with the audio signal using a modulation envelope, E(t), wherein the modulation envelope is expressed as "E(t)=N{L(t)+M(t)+mg(t)}," "N{ . . . }" corresponding to a predetermined nonlinear operator function, "L(t)" corresponding to a predetermined dynamic level control function, "M(t)" corresponding to a predetermined modulation offset function, "g(t)" corresponding to the audio signal, and "m" corresponding to a modulation depth.

3. The method of claim 2 further comprising:

deriving the predetermined modulation offset function, M(t), from one of an amplitude of the audio signal, a peak amplitude of the audio signal, and a peak envelope of the audio signal.

4. The method of claim 2 further comprising:

deriving the predetermined dynamic level control function, L(t), from one of an amplitude of the audio signal, a peak amplitude of the audio signal, and a peak envelope of the audio signal.

5. The method of claim 2 wherein the modulating of the ultrasonic carrier signal with the audio signal at under-modulation and at maximum modulation includes modulating the ultrasonic carrier signal with the audio signal using a modulation envelope, E(t), wherein the modulation envelope, E(t), is expressed as E(t)=N{L(t)+M(t)+mg(t)}, and wherein the predetermined nonlinear operator function, N{ . . . }, approximates a square root operator function.

6. The method of claim 2 further comprising:

determining the modulation offset function, M(t), such that M(t) is dependent upon L(t).

7. The method of claim 6 wherein the determining of the modulation offset function, M(t), includes determining M(t) such that, for each of a maximum and a minimum of L(t), M(t) is equal to approximately zero.

8. The method of claim 7 wherein the determining of the modulation offset function, M(t), further includes determining M(t) such that a maximum of M(t) is intermediate to the maximum and the minimum of L(t).

9. The method of claim 6 further comprising:

determining the modulation offset function, M(t), as one of a smooth curve, a piecewise curve, and a square-shaped curve.

10. The method of claim 2 further comprising:

deriving the modulation offset function, M(t), from one of a peak amplitude and a peak envelope of the audio signal.

11. A parametric loudspeaker system, comprising:

a modulator for modulating an ultrasonic carrier signal with an audio signal, the audio signal having, for a duration of the audio signal, low audio signal levels, intermediate audio signal levels, and high audio signal levels;

at least one driver amplifier for amplifying the ultrasonic carrier signal; and one or more ultrasonic transducers for directing the ultrasonic carrier signal through air along a selected projection path, wherein the modulator is operative:

for the intermediate audio signal levels, to modulate the ultrasonic carrier signal with the audio signal at under-modulation;

for the low audio signal levels, to reduce a predetermined modulation offset to obtain a reduced ultrasonic signal level; and for the high audio signal levels, to modulate the ultrasonic carrier signal with the audio signal at maximum modulation.

12. The system of claim 11 wherein the modulator is further operative to modulate the ultrasonic carrier signal with the audio signal at under-modulation and at maximum modulation using a modulation envelope, E(t), wherein the modulation envelope, E(t), is expressed as "E(t)=N{L(t)+M(t)+mg(t)}", "N{ . . . }" corresponding to a predetermined nonlinear operator function, "L(t)" corresponding to a predetermined dynamic level control function, "M(t)" corresponding to a predetermined modulation offset function, "g(t)" corresponding to the audio signal, and "m" corresponding to a modulation depth.

13. The system of claim 12 wherein the predetermined modulation offset function, M(t), is derived from one of an amplitude of the audio signal, a peak amplitude of the audio signal, and a peak envelope of the audio signal.

14. The system of claim 12 wherein the predetermined dynamic level control function, L(t), is derived from one of an amplitude of the audio signal, a peak amplitude of the audio signal, and a peak envelope of the audio signal.

15. The system of claim 12 wherein the predetermined nonlinear operator function, N{ . . . }, approximates a square root operator function.

16. The system of claim 12 wherein the modulation offset function, M(t), is dependent upon L(t).

17. The system of claim 16 wherein, for each of a maximum and a minimum of L(t), M(t) is equal to approximately zero.

18. The system of claim 17 wherein a maximum of M(t) is intermediate to the maximum and the minimum of L(t).

19. The system of claim 16 wherein the modulation offset function, M(t), as one of a smooth curve, a piecewise curve, and a square-shaped curve.

20. The system of claim 12 wherein the modulation offset function, M(t), is derived from one of a peak amplitude and a peak envelope of the audio signal.

* * * * *